United States Patent
Boday et al.

(10) Patent No.: US 9,957,345 B2
(45) Date of Patent: May 1, 2018

(54) 3D PRINTING WITH PHT BASED MATERIALS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Alshakim Nelson, San Carlos, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 665 days.

(21) Appl. No.: 14/461,813

(22) Filed: Aug. 18, 2014

(65) Prior Publication Data
US 2016/0046755 A1 Feb. 18, 2016

(51) Int. Cl.
*C08G 12/08* (2006.01)
*B29C 67/00* (2017.01)
(Continued)

(52) U.S. Cl.
CPC .......... *C08G 12/08* (2013.01); *B29C 67/0055* (2013.01); *B29K 2061/20* (2013.01); *B33Y 10/00* (2014.12); *B33Y 70/00* (2014.12)

(58) Field of Classification Search
CPC .................................................. C08G 12/08
See application file for complete search history.

(56) References Cited

U.S. PATENT DOCUMENTS 2,889,277 A 6/1959 Hughes
3,340,232 A 9/1967 Smith et al.
(Continued)

FOREIGN PATENT DOCUMENTS

CN 101265255 A 9/2008
EP 2636697 A1 9/2013
(Continued)

OTHER PUBLICATIONS

Ke Sun et al., 3 D Printing of Interdigitated Li-Ion Microbattery Architectures, Advanced Materials, 2013, pp. 4539 to 4543, Wiley-VCH, USA.
(Continued)

*Primary Examiner* — Larry Thrower
(74) *Attorney, Agent, or Firm* — Patterson + Sheridan, LLP

(57) ABSTRACT

This application describes methods of forming an object. The methods described include flowing a polyhemiaminal (PHA), polyhexhydrotriazine (PHT), or polyoctatriazacane (POTA) precursor mixture to a nozzle of a 3D printer, heating the PHA, PHT, or POTA precursor to a temperature of at least 50° C., dispensing the PHA, PHT, or POTA precursor in a pattern; and, hardening the PHA, PHT, or POTA precursor into a polymer. The PHA and PHT polymers are formed by reacting a primary diamine with a formaldehyde-type reagent. The POTA polymer is formed by reacting a primary diamine with a formaldehyde-type reagent and formic acid. The objects formed using the methods described herein may be made of a single polymer, a single polymer type using multiple diamine monomers, or a mixture of PHA, PHT, and/or POTA polymers with different desired physical properties.

17 Claims, 4 Drawing Sheets

(51) Int. Cl.
*B33Y 10/00* (2015.01)
*B33Y 70/00* (2015.01)
*B29K 61/20* (2006.01)

(56) References Cited

U.S. PATENT DOCUMENTS

| | | | |
|---|---|---|---|
| 3,598,748 | A | 8/1971 | Hirosawa |
| 3,957,742 | A | 5/1976 | Kveton |
| 3,969,300 | A | 7/1976 | Nagata et al. |
| 4,003,864 | A | 1/1977 | Roth et al. |
| 4,106,904 | A | 8/1978 | Oude Alink et al. |
| 4,160,754 | A | 7/1979 | Schapel et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,877,451 | A | 10/1989 | Winnik et al. |
| 5,002,830 | A | 3/1991 | Gillis et al. |
| 5,010,144 | A | 4/1991 | Phanstiel, IV et al. |
| 5,089,567 | A | 2/1992 | Phanstiel et al. |
| 5,112,796 | A | 5/1992 | Iannicelli |
| 5,210,191 | A | 5/1993 | Phanstiel et al. |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 8,841,134 | B2 | 9/2014 | Papineni et al. |
| 8,907,049 | B2 | 12/2014 | Baidak et al. |
| 8,980,278 | B2 | 3/2015 | Steinberg et al. |
| 8,980,295 | B2 | 3/2015 | Kao et al. |
| 2004/0048782 | A1 | 3/2004 | Bryson |
| 2004/0209987 | A1 | 10/2004 | Gajiwala |
| 2005/0089744 | A1 | 4/2005 | Kim et al. |
| 2007/0031498 | A1 | 2/2007 | Zong et al. |
| 2008/0014438 | A1 | 1/2008 | Ruhle et al. |
| 2009/0039018 | A1 | 2/2009 | Jordi et al. |
| 2010/0107476 | A1 | 5/2010 | Cosimbescu |
| 2011/0114493 | A1 | 5/2011 | Macnamara et al. |
| 2012/0049308 | A1 | 3/2012 | Nishimura et al. |
| 2013/0204010 | A1 | 8/2013 | Grinstaff et al. |
| 2014/0058047 | A1 | 2/2014 | Grinstaff et al. |
| 2015/0084232 | A1 | 3/2015 | Rutz et al. |
| 2015/0104579 | A1 | 4/2015 | Hedrick et al. |
| 2015/0148488 | A1 | 5/2015 | Greger et al. |
| 2016/0046831 | A1 | 2/2016 | Boday et al. |
| 2017/0066878 | A1 | 3/2017 | Boday et al. |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Manfred Hofmann, 3D Printing Gets a Boost and Opportunities with Polymer Materials, ACS Macro Letters, 2013, pp. 382 to 386, Switzerland.

U.S. Appl. No. 14/461,844, entitled 3D Printing With PHT/PHA Based Materials and Polymerizable Monomers, filed Aug. 18, 2014.
U.S. Appl. No. 14/564,973, entitled 3D Printing With PHT/PHA Based Materials and Polymerizable Monomers, filed Dec. 9, 2014.
U.S. Appl. No. 14/951,186 entitled "Systems Chemistry Approach to Polyhexahdrotraizine Polymeric Structures", filed Nov. 24, 2015.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005 pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Wang Yulan et al., Synthesis and Properties of Poly-1, 3, 5-Triazines, Polymer Communications, No. 2, 1984, pp. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Ferrar, "Reactions of Formaldehyde With Aromatic Amines," J. Appl. Chem, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexhydrotriazine polymer networks," Mat Res Innovat (2002)6:179-184.
Oliver, et al. "Measurement of hardness and elastic modulus by; instrumented indentation: Advances in understanding and; refinements to methodology," J. Mater. Res., vol. 19, No. 1, Jan. 2004, 3-20.
Singh, et al., "Ultrasound mediated Green Synthesis of Hexa-hydro Triazines," J. Mater. Environ. Sci. 2(4)(2011) 403-406.
Stafford, et al., "A buckling-based metrology for measuring; the elastic moduli of polymeric thin films," Nature Materials_3_Aug. 2004, 545-550;Published online: Jul. 11, 2004.
M. Hofmann., 3D Printing Gets a Boost and Opportunities with Polymer Materials, ACS MacroLetters., 2014, 382-286.
K. Sun et al., 3D Printing of Interdigitated Li-lin Microbattery Architectures, Adv. Mater., 2013, 4539-4543.
Fox et al, Supramolecular Motifs in Dynamic Covalent PEG-Hemiaminal Organogels, Nature Communications, 6:7417, Jul. 15, 2015, 8 pages.

3D PRINTING WITH PHT BASED MATERIALS

FIELD

The present disclosure relates to new 3D printing methods and apparatus. Specifically, new materials are disclosed for use in 3D printing methods, with apparatus for performing such methods.

BACKGROUND 3D printing has attracted significant attention for its potential as a new manufacturing process offering versatility in the ability to rapidly produce tailored physical objects from the micro to macro scale. While the foundations of this technology were laid in the late 1980's, modern advancements have produced 3D-printers for applications such as personal home use, rapid prototyping, and production of biomedical devices. Hofmann, M.; ACS MacroLett., 2014, 3, 382-286. While the hardware utilized in this field is rapidly maturing, the materials used in the printing process generally rely on traditional commercial polymers such as poly(methyl methacrylate). However, in academic settings more exotic materials are in the phases of exploratory research. Sun, K., Wei, T. S., Ahn, B. Y., Seo, J. Y., Dillon, S. J., Lewis, J. A., Adv. Mater., 2013, 25, 4539-4543.

The field of 3D-printing can be significantly impacted by expanding the repertoire of materials available (and associated properties) as printable media. The ability to rapidly form dynamically crosslinked networks during material deposition is an attractive property for a printable medium. Extensive crosslinking of such a medium would yield a rigid structure with mechanical properties that could facilitate the printing of macroscale objects. In addition, a material with reversible thermosetting properties would allow one to modify a physical object after it is printed, offering an additional level of control not available when traditional materials are utilized as print media. In addition, the blending of materials that can participate in network formation would provide tailorable mechanical properties in the final structure. Use of such materials in 3D-printing methods and apparatus would expand the applicability of 3D printing.

SUMMARY

This application describes methods of forming an object. The methods described include flowing a PHA, PHT, or POTA precursor mixture to a nozzle of a 3D printer, heating the PHA, PHT, or POTA precursor to a temperature of at least 50° C., dispensing the PHA, PHT, or POTA precursor in a pattern; and, hardening the PHA, PHT, or POTA precursor into a polymer.

Some methods of forming an object described in this application include flowing a first mixture comprising a formaldehyde-type reagent through a first pathway, flowing a second mixture comprising a primary diamine through a second pathway, mixing the first and second mixtures to form a PHA, PHT, or POTA precursor, flowing the PHA, PHT, or POTA precursor to a nozzle of a 3D printer, supplying heat to the nozzle of the 3D printer to heat the PHA, PHT, or POTA precursor to a temperature of at least 50° C., dispensing the PHA, PHT, or POTA precursor in a pattern onto a substrate to form a precursor object comprising a PHA, PHT, or POTA cross-linked polymer, and hardening the PHA, PHT, or POTA precursor into a polymer by heating the precursor object to a temperature of at least 50° C.

The PHA and PHT polymers are formed by reacting a primary diamine with a formaldehyde-type reagent. The POTA polymer is formed by reacting a primary diamine with a formaldehyde-type reagent and formic acid. The objects formed using the methods described herein may be made of a single polymer, a single polymer type using multiple diamine monomers, or a mixture of PHA, PHT, and/or POTA polymers with different desired physical properties.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Polyhemiaminals (PHA's), polyhexahydrotriazines (PHT's), and polyoctatriazacanes (POTA) are new polymeric materials that may be advantageously used for 3D printing. These three classes of polymers are generally made by mixing one or more primary diamines with a formaldehyde-type reagent, such as formaldehyde or solid or liquid oligomers of formaldehyde, including paraformaldehyde, in a solvent and heating the resulting mixture. To form a polyoctatriazacane, formic acid is also added to the mixture.

A source of any such material may be coupled to a 3D printing apparatus to perform a patterned deposition of a curable PHA, PHT, or POTA material, or a mixture thereof, to form an object. The source may be an ampoule, tank, or vessel containing a PHA, PHT, or POTA material, or a mixture thereof, in a solvent or organogel. The source may also be a plurality of ampoules, tanks, or vessels containing precursors to form any or all of a PHA, PHT, or POTA material.

Figure 1:
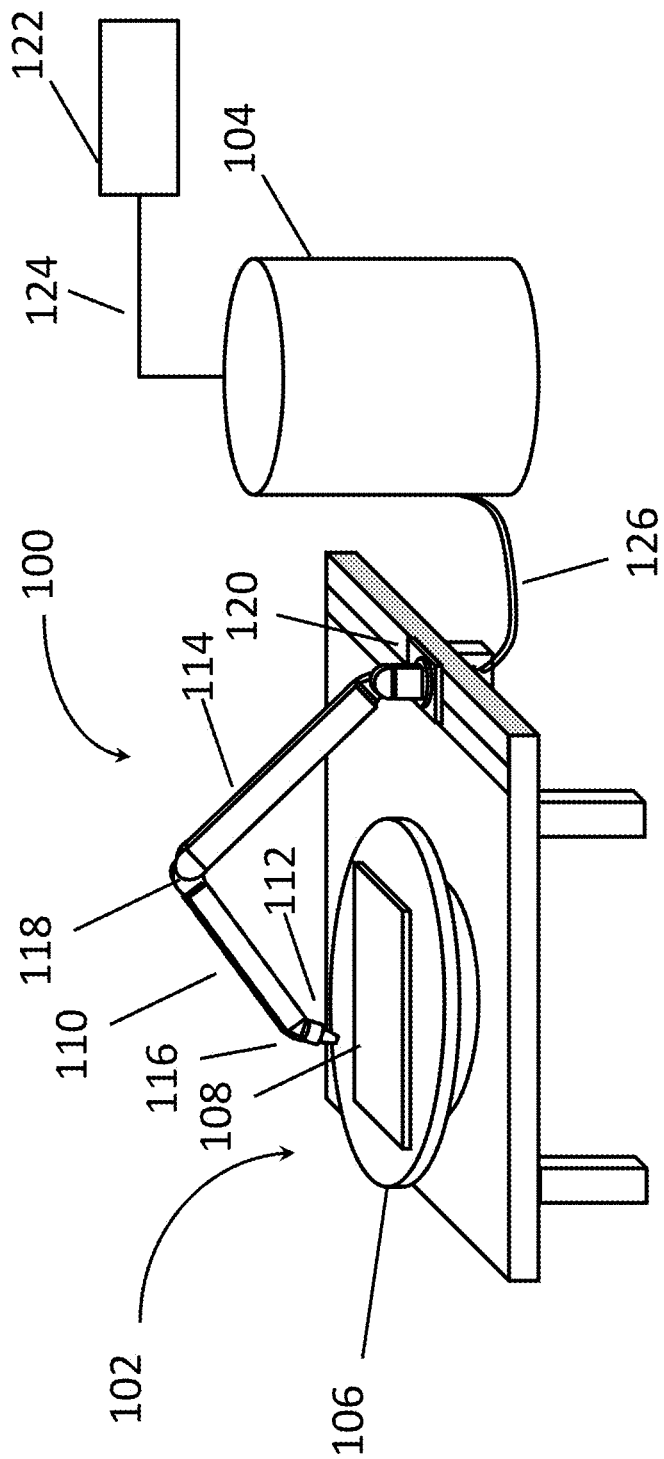
FIG. 1 is a schematic side view of a 3D printing apparatus according to one embodiment.

FIG. 1 is a schematic side view of a 3D printing apparatus 100 according to one embodiment. The apparatus 100 comprises a 3D printer 102 and a source 104 of a print medium containing a PHA, PHT, and/or POTA material. The 3D printer 102 includes a stage 106 for a substrate or workpiece 108, and a dispenser 110 for dispensing the print material onto the substrate 108. The substrate 108 can be any suitable substrate for receiving a 3D printed object. Non-limiting examples of these materials include semiconductor wafers (e.g., silicon wafers), most metals, refractory materials, glass, ceramics, and polymers. In some aspects, a substrate may be, without limitation, an electronic device, microchip, microelectronic device, printed circuit board, hard disk drive platter, a portion of fluid filter, and portion of a hydrocarbon (e.g., petroleum, natural gas, or petro-chemical) processing facility such as a pipe, pipeline, fluid pumping device, distillation column, a reaction vessel, or storage tank.

The stage 106 may comprise an x-y-z actuator for positioning the substrate 108 in three dimensions. The dispenser 110 may be actuated in one, two, or three dimensions. In FIG. 1, the dispenser 110 has a nozzle 112 coupled to an articulated positioning arm 114 with a 3-axis rotational positioner 116 coupled to a two-arm translation arm 118, which is in turn coupled to a carriage 120. Such a positioning apparatus may be used to position the dispensing tip of the nozzle 112 at any location in three dimensions and pointing any direction. A source 122 of constant pressure, such as a pressurized gas, may be used to force the print material steadily through the nozzle 112. The source 122 of constant pressure is typically coupled by a conduit 124 to a head space inside the source 104 of print medium. The source 104 of print medium is coupled to the 3D printer 102 by a conduit 126 that may be a flexible or rigid tube or pipe. The conduit 126 is shown coupled to the 3D printer 102 at the carriage 120 in FIG. 1, but the conduit 126 may be coupled to the 3D printer at any convenient location from the carriage 120 to the nozzle 112.

Figure 2:
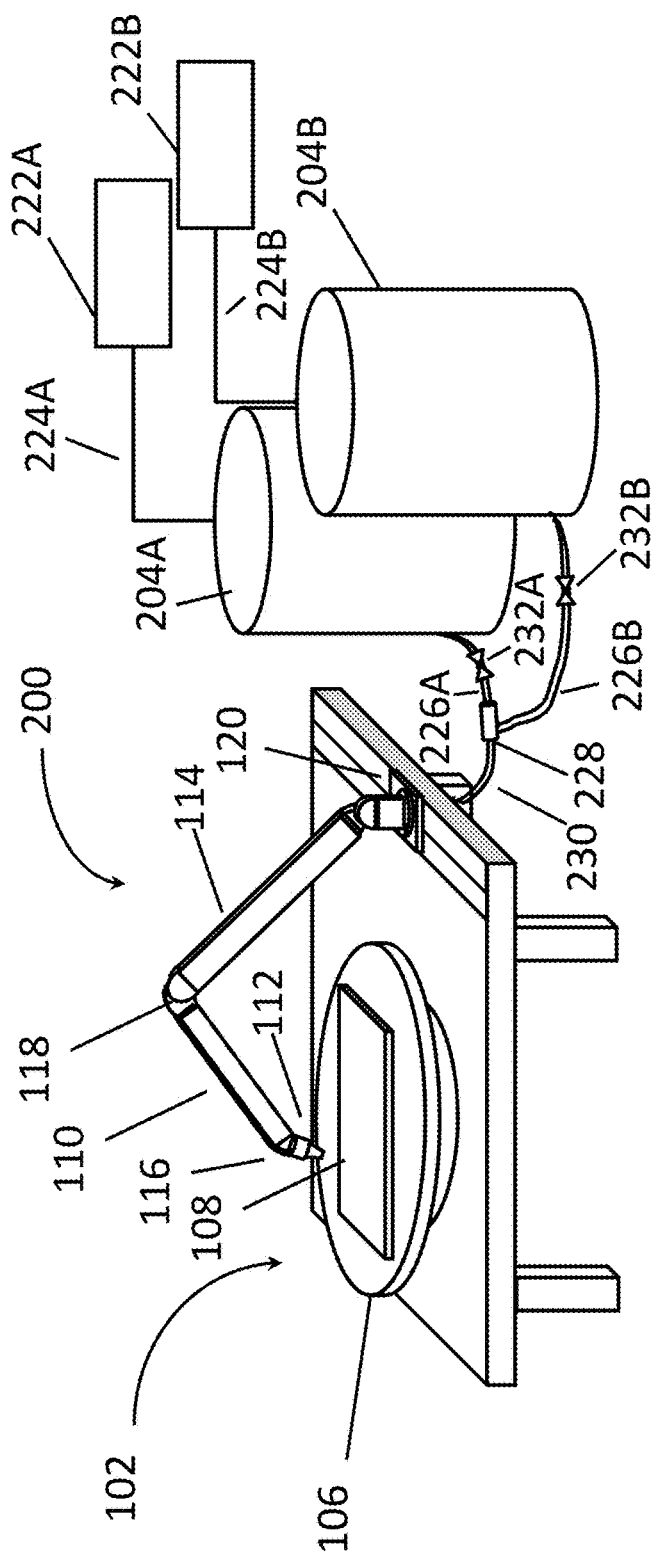
FIG. 2 is a schematic side view of a 3D printing apparatus according to another embodiment.

FIG. 2 is a schematic side view of a 3D printing apparatus 200 according to another embodiment. The apparatus 200 comprises the 3D printer 102 and two sources 204A and 204B of precursors for forming a print medium containing a PHA, PHT, and/or POTA material. There are two sources 204A and 204B shown in FIG. 2 for illustration, but any number of sources may be used. In an embodiment where two sources 204A and 204B are used, the first source 204A may have a first precursor mixture that is unreactive, and the second source 204B may have a second precursor mixture that is unreactive, such that mixing the first and second precursor mixtures forms a PHA, PHT, and/or POTA material. For example, the first precursor mixture may contain a formaldehyde-type reagent, a solvent, and/or formic acid, and the second precursor mixture may contain one or more diamines and a solvent. In embodiments with three or more sources, the ingredients may be stored and delivered separately. For example, one source may contain one or more diamines, one source may contain a formaldehyde-type reagent, one source may contain formic acid, and one source may contain solvent.

Each source 204A, 204B has a respective source 222A, 222B of constant pressure coupled to a head space of each respective source 204A, 204B by a conduit 222A, 222B. Flow from each source 204A, 204B proceed through a respective conduit 226A, 226B. A mixer 228 may couple the conduits 226A, 226B, such that a combined reactive mixture is delivered through the connection conduit 230 to the 3D printer 102. The mixer 228 and connection conduit 230 may be temperature controlled to control the degree of reaction in the connection conduit 230. If no reaction is desired, the mixer 228 and connection conduit 230 may be cooled by jacketing with a cooling medium. Valves 232A, 232B may be provided to control flow of the first and second precursor mixtures from the respective sources 204A, 204B.

The mixer 228 is shown in FIG. 2 at a location before any precursors reach the 3D printer 102, but the mixer may be located anywhere between the precursor vessels 204A, 204B and the nozzle 112, for example on the articulated positioning arm 114.

The nozzle 110 may be a single path nozzle for flowing a single mixture of print material, for example PHA, PHT, and or POTA in a solvent or as an organogel, onto the substrate.

Figure 3A:
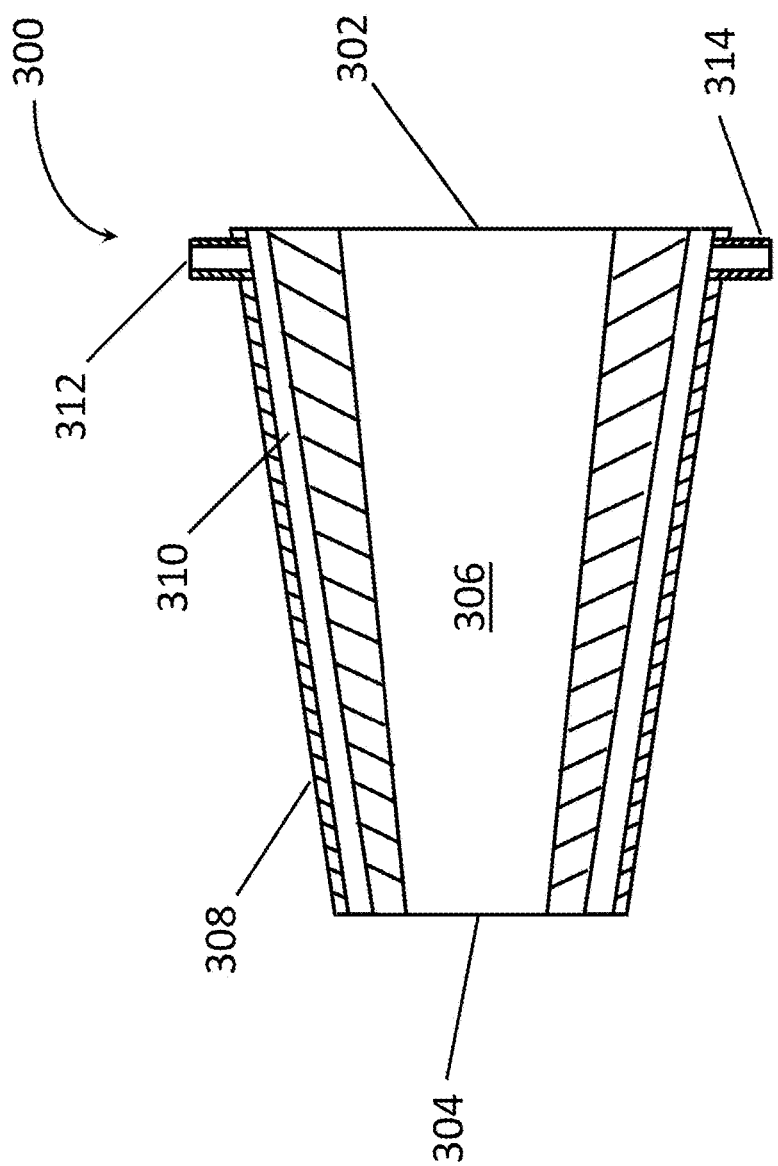
FIG. 3A is a cross-sectional view of a nozzle according to one embodiment that may be used in the 3D printing apparatus of FIGS. 1 and 2.

FIG. 3A is a cross-sectional diagram of a nozzle 300 according to one embodiment that may be used as the nozzle 110. The nozzle 300 has an inlet 302 and an outlet 304 of a flow path 306 through the nozzle 300. The flow path 306 has a diameter that decreases from the inlet 302 to the outlet 304, but the decreasing flow path is optional. The flow path may have a constant diameter, a diameter that increases from the inlet 302 to the outlet 304, or a diameter that changes according to any desired pattern. The nozzle 300 has a jacket 308 that encloses a flow path 310 for a thermal control medium. The thermal control medium may flow into the jacket 308 through an inlet 312, may flow through the flow path 310, and may flow out of the jacket 308 through an outlet 314. The thermal control medium may be used to apply heat to the nozzle 300 to control physical properties such as viscosity of a material being dispensed through the nozzle 300, or to activate a reaction among components of a material being dispensed through the nozzle 300. The nozzle 300 may, for example, be used to perform any of the methods described herein. Alternately, the jacket 308 may contain a resistive heating medium with power leads disposed through the inlet 312 and the outlet 314. The outside of the nozzle 300 may be insulated, if desired, to prevent heat loss and unwanted exposure to heated surfaces of the nozzle 300.

Figure 3B:
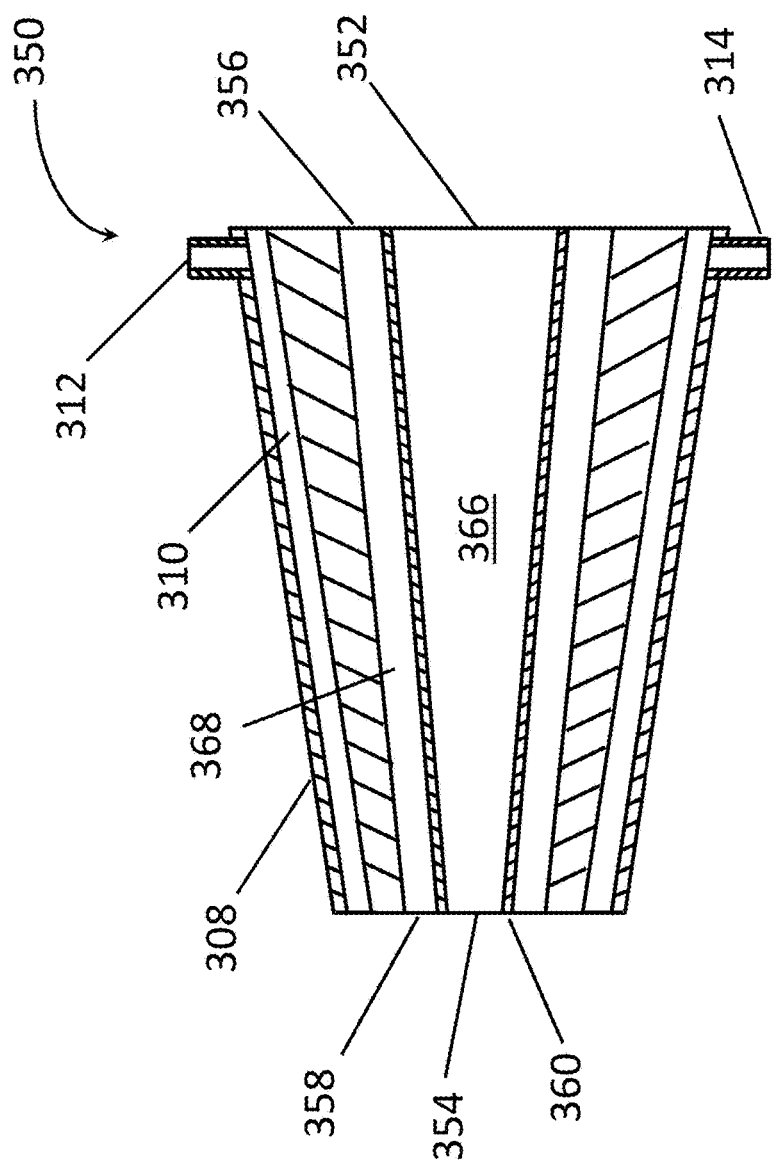
FIG. 3B is a cross-sectional view of a nozzle according to another embodiment that may be used in the 3D printing apparatus of FIGS. 1 and 2.

FIG. 3B is a cross-sectional view of a nozzle 350 according to another embodiment that may be used as the nozzle 110. The nozzle 350 has most of the features of the nozzle 300, with an additional concentric flow path. The nozzle 350 has a first inlet 352 and a first outlet 354 that form a first flow path 366, and a second inlet 356 and a second outlet 358 that form a second flow path 368 separated from the first flow path 366 by an annular wall 360. The second flow path 368 is annular and surrounds the first flow path 366. The nozzle 350 may be used to keep two streams separate until they leave the nozzle 350 in the event the two streams are reactive. The nozzle 350 may thus be used to dispense a first mixture through the first flow path 366 and a second mixture through the second flow path 368 such that the first and second mixtures react upon leaving the nozzle 350 and form a PHA, PHT, or POTA material after leaving the nozzle 350. It should be noted that the annular second flow path 368 is shown in FIG. 3B having a constant cross-sectional flow area, but the second flow path 368 may have a cross-sectional flow area that changes according to any desired pattern.

A PHA is a polymer that is generally prepared at a temperature of about 20° C. to about 120° C., more, preferably at about 20° C. to about 100° C., and most preferably at about 40° C. to about 60° C. The PHA's form films when cast from a polar aprotic solvents (e.g., NMP), and the PHA films are stable at a temperature of about 20° C. to less than 150° C. The PHA films can have a Young's modulus of about 6 GPa, which is exceptionally high for an organic film. Such properties are useful in forming objects by 3D printing processes in which films of material are repeatedly deposited to build up a desired object.

The PHT films are formed by thermally treating a PHA film at a temperature of at least 150° C., preferably about 165° C. to about 280° C., more preferably about 180° C. to about 210° C., and most preferably about 190° C. to about 210° C. for a period of time of about 1 minute to about 24 hours, and more preferably about 1 hour. The PHT films can have high heat resistance as measured by dynamic mechanical analysis (DMA). The PHT films can also have a high Young's modulus as measured by nanoindentation methods. In some instances, the Young's modulus of a PHT film can have a value in a range of about 8 GPa to about 14 GPa, exceeding that of bone (9 GPA).

A polyhemiaminal (PHA) is a crosslinked polymer comprising i) a plurality of trivalent hemiaminal groups of formula (1):

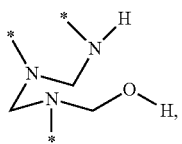
(1)

covalently linked to ii) a plurality of bridging groups of formula (2):

K'—(*)_{y'}  (2), wherein y' is 2 or 3, and K' is a divalent or trivalent radical comprising at least one 6-carbon aromatic ring. Herein, starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented by formula (3):

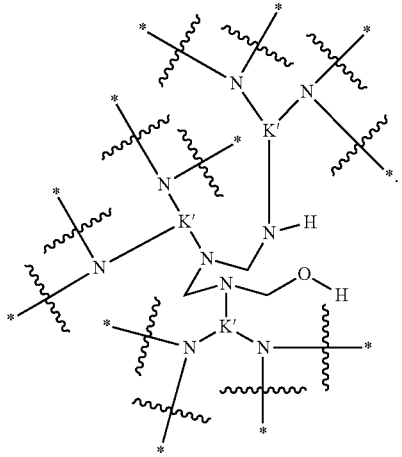
(3)

In this instance, each K' is a trivalent radical (y'=3) comprising at least one 6-carbon aromatic ring. It should be understood that each nitrogen having two starred wavy bonds in formula (3) is a portion of a different hemiaminal group.

Non-limiting exemplary trivalent bridging groups include:

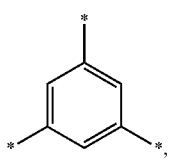

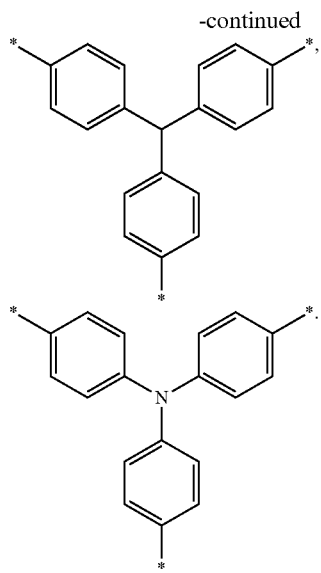
and

The bridging groups can be used singularly or in combination.

Each K' can also be a divalent bridging group. Polyhemiaminals composed of divalent bridging groups K' can be represented herein by formula (4):

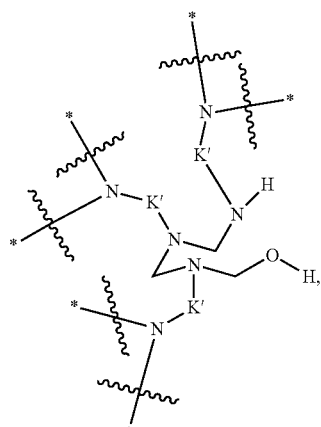
(4)

wherein K' is a divalent radical (y'=2 in formula (2)) comprising at least one 6-carbon aromatic ring. Each nitrogen having two starred wavy bonds in formula (4) is a portion of a different hemiaminal group.

More specific divalent bridging groups may have the formula (5):

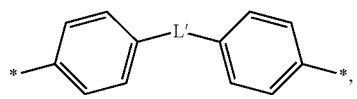
(5)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

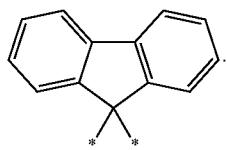 [SMILES: *C1(*)c2ccccc2-c2ccccc21]

Polyhemiaminals composed of divalent bridging groups of formula (5) can be represented herein by formula (6):

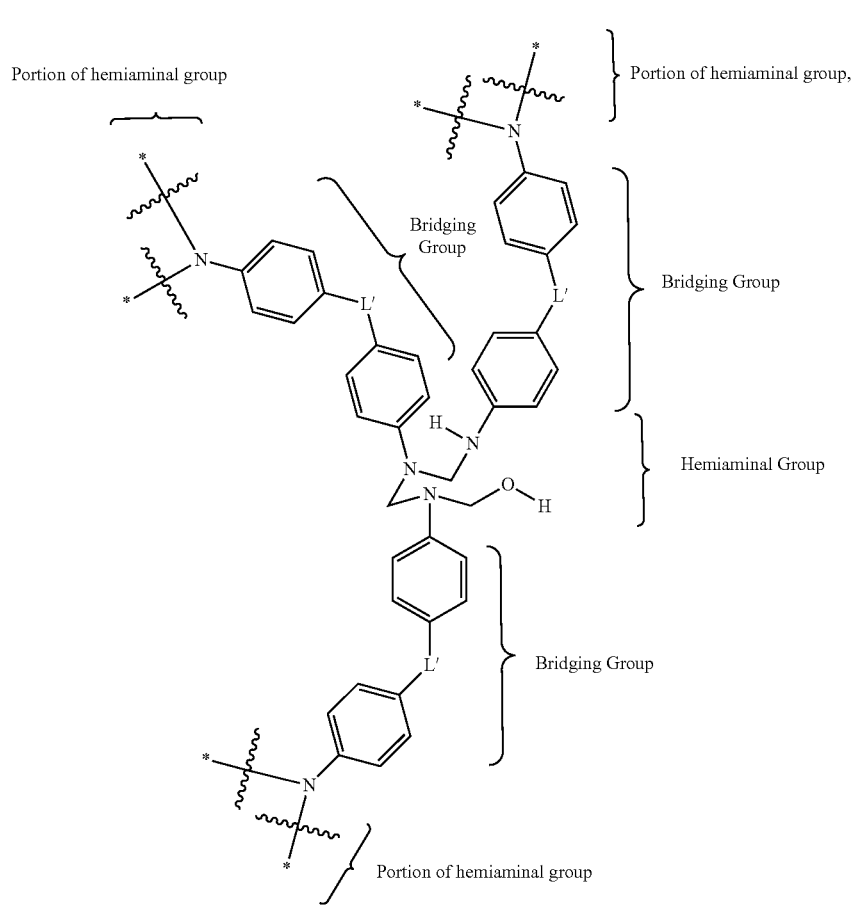

(6)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (6) is a portion of a different hemiaminal group.

The hemiaminal groups can be bound non-covalently to water and/or a solvent. A non-limiting example is a hemiaminal group that is hydrogen bonded to two water molecules as shown in formula (7):

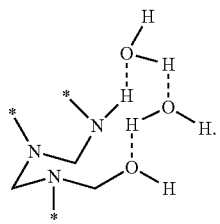

(7)

A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups.

The mole ratio of paraformaldehyde: total moles of primary aromatic amine groups (e.g., diamine monomer plus optional monoamine monomer) is preferably about 1:1 to about 1.25:1, based on one mole of paraformaldehyde equal to 30 grams.

A polyhexahydrotriazine (PHT) is a crosslinked polymer comprising i) a plurality of trivalent hexahydrotriazine groups of formula (8):

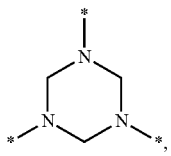

(8)

covalently linked to ii) a plurality of divalent bridging groups K' (y'=2) of formula (2). Each starred bond of a given hexahydrotriazine group of formula (8) is covalently linked to a respective one of the bridging groups K'. Additionally, each starred bond of a given bridging group is covalently linked to a respective one of the hexahydrotriazine groups.

For PHTs comprising bridging groups of formula (5), the polyhexahydrotriazine is represented herein by formula (9):

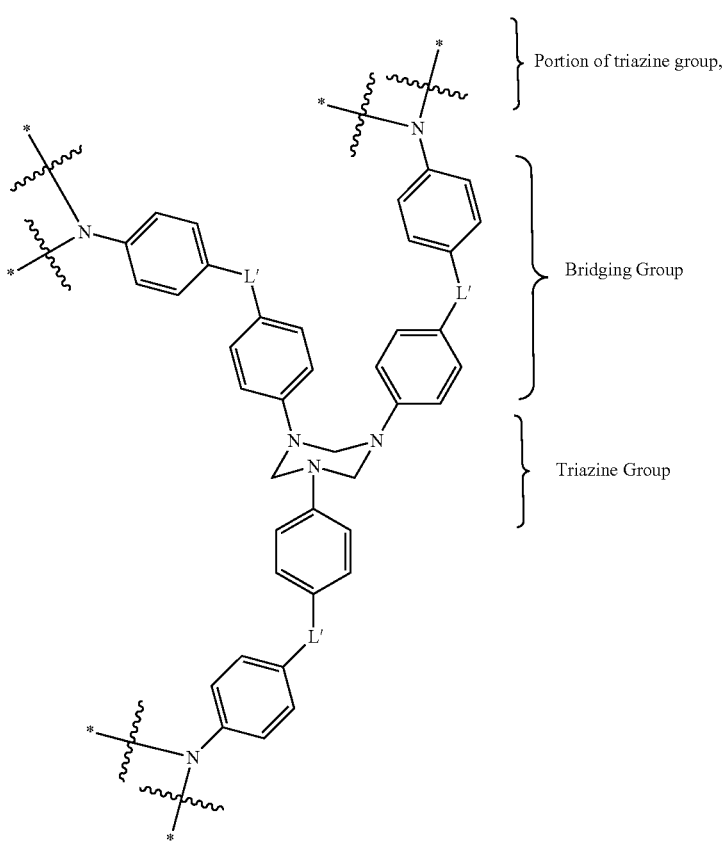

(9)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (9) is a portion of a different hexahydrotriazine group.

The polyhexahydrotriazine can be bound non-covalently to water and/or a solvent (e.g., by hydrogen bonds).

Exemplary non-limiting divalent bridging groups include:

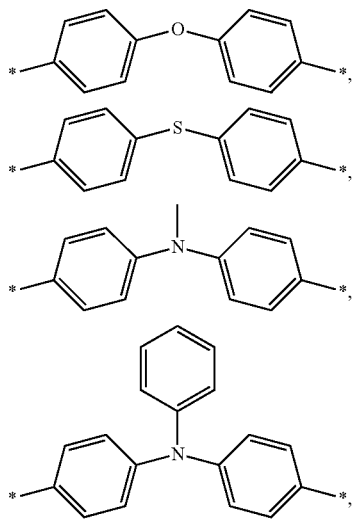

-continued

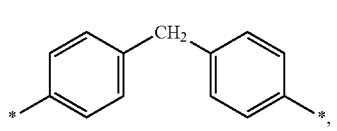

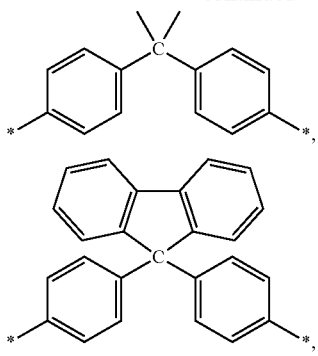

and
combinations thereof.

A method of preparing a polyhexahydrotriazine (PHT) having divalent bridging groups comprises forming a first mixture comprising i) a monomer comprising two aromatic primary amine groups, ii) an optional diluent monomer comprising one aromatic primary amine group, iii) paraformaldehyde, and iv) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

A polyoctatriazacane ("POTA") is a polymer having the general structure

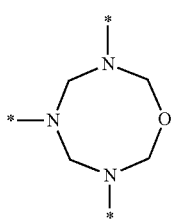

(10)

A plurality of the trivalent octatriazacane groups of formula (10) are bonded, at the starred bonds, to divalent linking groups having the general structure *—K'—*, where K' comprises an aromatic group. A polyoctatriazacane according to formula (10) may be made by mixing together a diamine, or a mixture of diamines, having the general structure $H_2N$—K'—$NH_2$, where K' is defined as above, with an aldehyde (i.e. formaldehyde, paraformaldehyde, acetaldehyde, benzaldehyde, etc.), a solvent, and formic acid.

K' may be a substituted or unsubstituted phenylene group having the general structure of formula (11):

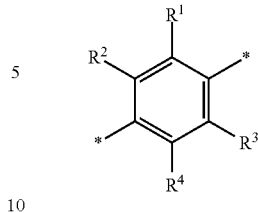

(11)

where $R^1$, $R^2$, $R^3$, and $R^4$ are each, individually, H, Cl, CN, F, $NO_2$, $SO_3$, heterocycles such as imides, benzoxazoles, benzimidazoles, and phenylquinoxalines, $C_xH_{2x+1-y}R^5_y$, or $C_6H_{5-a}R^5_a$, where $R^5$ is Cl, F, $SO_3$, $C_6H_{5-a}R^6_a$, or $NH_{3-b}R^6_b$, where $R^6$ is $C_xH_{2x+1}$, $C_xH_{2x}$, or $C_6H_5$, where in each instance x is an integer from 1 to 4, y is an integer from 0 to 2x+1, a is an integer from 0 to 5, and b is an integer from 0 to 3. Thus, in addition to an aromatic group, K' may have fluorine, chlorine, or sulfonate groups. Exemplary diamine reactants of this type include phenylene diamine, a fluoromethyl phenylene diamine such as a phenylene diamine in the para or meta configuration with one to four fluoromethyl groups, each of which may have one to three fluorine atoms, an alkyl fluoromethyl phenylene diamine with a mixture of alkyl and fluoromethyl substituents, or a phenylene triamine with no more than one amino group having substituents, may also be used. For example, tetrakis-(2,3,5,6-trifluoromethyl)-1,4-diamino benzene, bis-(2,5-trifluoromethyl)-1,4-diamino benzene, or 2-fluoromethyl-bis-(3,5-difluoromethyl)-1,4,-diamino benzene may be used.

K' may also be a polynuclear aromatic group, such as a naphthalene group, an acenaphthene group, an acenaphthylene group, a fluorene group, a phenalene group, or an anthracene group, any of which may be substituted at any non-amino carbon atom with substituted or unsubstituted alkyl or aryl groups or halogens, or may be partially saturated (e.g. dialin, tetralin groups). K' may also be a substituted or unsubstituted indene, indane, or indole group.

K' may also be a phenyl containing group having the general structure of formula (12)

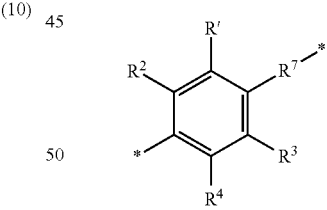

(12)

where $R^7$ is a substituted or unsubstituted alkyl, aryl, or polyaromatic group, any of which may be substituted at any non-amino carbon atom with a substituted or unsubstituted alkyl or aryl group, or a halogen. Thus, $R^7$ may be $SO_2$, $C_xH_{2x-y}R^5_y$, or $C_6H_{5-a}R^5_a$, with x, y, and a defined as above.

K' may also have the structure of formula (5) wherein L' is a divalent linking group selected from the group consisting of *—$SO_2$—*, *—N(R')—*, *—N(H)—*, *—$CF_2$—*, *—$C(CF_3)_2$—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. For example, L' may be a linear hydrocarbyl group having from 1 to 4 carbon atoms. Other L' groups include methylene (*—CH$_2$—*), isopropylidenyl (*—C(Me)$_2$-*), and fluorenylidenyl:

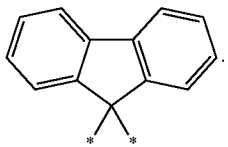 [SMILES: *C1(*)c2ccccc2-c2ccccc21]

A phenylenedianiline such as p-phenylenedianiline may be used as a diamine reactant. A polyoctatriazacane may have a mixture of linking groups of formula (11) and formula (12).

In an embodiment, a polyoctatriazacane is a crosslinked polymer comprising i) a plurality of trivalent octatriazacane groups of formula (1) covalently linked to ii) a plurality of divalent bridging groups K' according to the descriptions of K' above. Each starred bond of a given octatriazacane group of formula (1) is covalently linked to a respective one of the bridging groups K'. Additionally, each starred bond of a given bridging group K' is covalently linked to a respective one of the octatriazacane groups.

Exemplary non-limiting divalent bridging groups include:

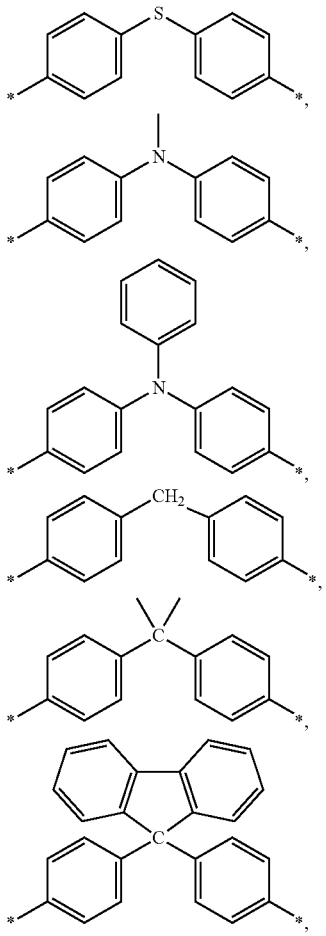

and
combinations thereof.

A method of preparing a polyoctatriazacane comprising divalent bridging groups comprises forming a mixture comprising i) a monomer comprising two or more primary aromatic amine groups, ii) an optional diluent monomer comprising one aromatic primary amine group, iii) an aldehyde, and iv) a solvent. The mixture is stirred while formic acid is added. Any aldehyde may be used, such as formaldehyde, paraformaldehyde, acetaldehyde, benzaldehyde, or the like. The equivalence ratio of aldehyde to total moles of primary aromatic amine groups (e.g., diamine monomer plus optional monoamine monomer) is preferably about 1:1 to about 1.25:1. Formic acid is generally added in sub-stoichiometric quantities, such as less than 0.8 equivalents, between about 0.1 equivalents and about 0.5 equivalents, for example about 0.5 equivalents.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

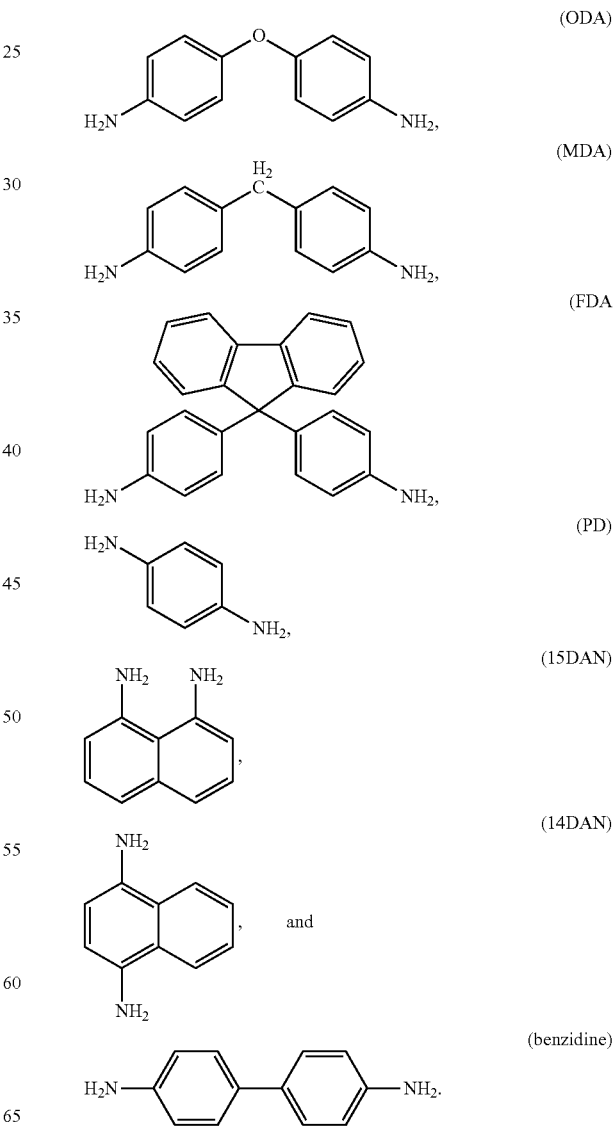

The PHA, PHT, and POTA materials useable for 3D printing as described herein can further comprise monovalent aromatic groups (referred to herein as diluent groups), which do not participate in chemical crosslinking and therefore can serve to control the crosslink density as well as the physical and mechanical properties of the PHA and PHT polymers. Monovalent diluent groups have a structure according to formula (13), formula (14), formula (15), and/or formula (16):

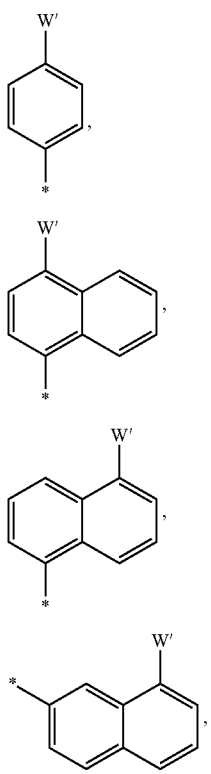

(13)

(14)

(15)

(16)

wherein W' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. The starred bond is linked to a nitrogen of a hemiaminal group or a hexahydrotriazine group.

Non-limiting exemplary diluent groups include:

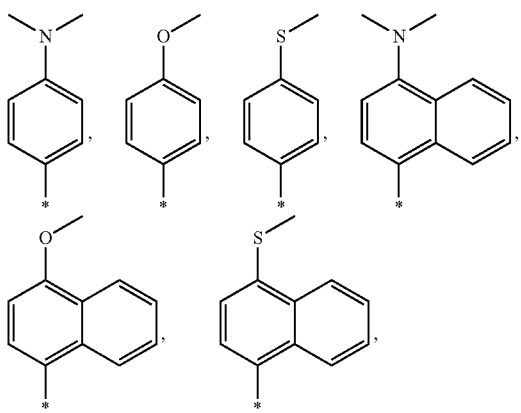

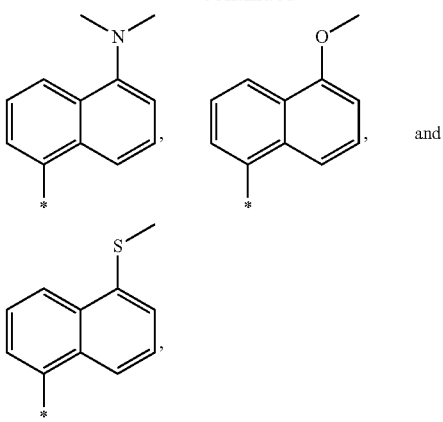

and wherein the starred bond is linked to a nitrogen of a hemiaminal group or a hexahydrotriazine group. Diluent groups can be used singularly or in combination.

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

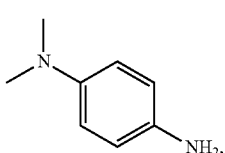

(DPD)

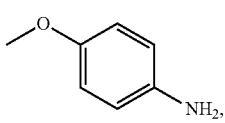

(MOA)

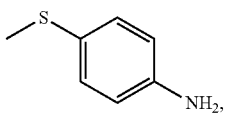

(MTA)

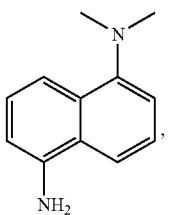

(15DMN)

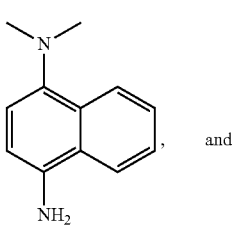

(14DMN)

and

-continued

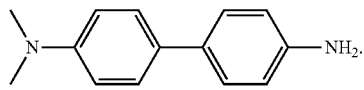
(DMB)

The diluent monomer can be used in an amount of 0 mole % to about 75 mole % based on total moles of monomer and diluent monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA).

A PHA film can be made by disposing a mixture comprising a polyhemiaminal and a solvent prepared as described above on a surface of a substrate to form a structure comprising an initial film layer comprising the polyhemiaminal, solvent and/or water. The initial film layer is heated at a temperature of about 20° C. to about 120° C. for about 1 minute to about 24 hours, thereby forming a structure comprising a polyhemiaminal (PHA) film layer on the covered surface of the substrate. The PHA film layer thus formed is substantially free of solvent and/or water. A film layer of this sort may be made in a localized area using the apparatus of FIGS. 1 and 2 as part of a 3D printing process for producing an object.

A PHT film may be made from the PHA film described above by heating the film layer made by the process above at a temperature of at least 150° C., preferably about 165° C. to about 280° C. even more preferably at about 180° C. to about 220° C., and most preferably at about 200° C., thereby forming a structure comprising a polyhexahydrotriazine (PHT) film layer disposed on the covered surface of the substrate. The heating time at any of the above temperatures can be about 1 minute to about 24 hours. The resulting PHT film layer is substantially free of solvent and water. The hemiaminal groups of the PHA film are substantially or wholly converted to hexahydrotriazine groups by heating the PHA film at a temperature in this range.

A polyoctatriazacane film may be coated onto a substrate by forming a first mixture comprising i) a monomer comprising two aromatic primary amine groups, ii) an optional diluent monomer comprising one aromatic primary amine group, iii) an aldehyde, and iv) a solvent, coating the mixture on the substrate to form a precursor layer, and then distributing formic acid over the precursor layer to form a polyoctatriazacane coating. The substrate can be any structurally strong substrate, such as a semiconductor wafer (e.g., silicon wafer), most metals, refractory materials, and other polymers. Any suitable coating technique (e.g., spin coating, dip coating, roll coating, spray coating, and the like) may be used. An adhesive bond may be formed in some cases if the first mixture is allowed to, or able to, penetrate into the surface of the substrate before reacting with the formic acid.

The number average molecular weight (Mn) of the PHA, PHT, and/or POTA polymers can be in a range of 1000 to 100,000, preferably in a range of 1000 to 50,000, and most preferably in a range of 1000 to 20,000.

An object may be made by 3D printing using the apparatus and methods described herein. A method of forming an object may include flowing a PHA, PHT, or POTA precursor to the nozzle of a 3D printer, heating the PHA, PHT, or POTA to a temperature of at least about 50° C., dispensing the PHA, PHT, or POTA precursor in a pattern, and hardening the PHA, PHT, or POTA into a cross-linked polymer. Dispensing the PHA, PHT, or POTA precursor in a pattern may include forming a first film of the PHA, PHT, or POTA precursor according to the film-formation processes described herein, and forming a second film of the PHA, PHT, or POTA precursor on the first film. In other embodiments, a two dimensional pattern may be formed on the substrate by applying a single layer film of PHA, PHT, or POTA material in a desired pattern.

The PHA, PHT, or POTA precursor may be a PHA, PHT, or POTA polymer dissolved in a solvent, or the PHA, PHT, or POTA precursor may be a mixture of monomers that form a PHA, PHT, or POTA polymer when reacted together. A first mixture may contain a primary diamine, and a second mixture may contain a formaldehyde-type reagent and, optionally, formic acid for forming an object containing POTA. The first mixture may be flowed through a first pathway, and the second mixture through a second pathway to prevent premature reaction of the monomers. The first and second mixture may be mixed together at a desired time to start the reaction. For example, using the apparatus 200, the first and second mixtures may be mixed at the mixer 228.

Heating the precursor to a temperature of at least about 50° C. may be accomplished by supplying heat to the nozzle of the 3D printer. For example, either the nozzle of FIG. 3A or the nozzle of FIG. 3B may be used with the apparatus 100 or the apparatus 200 to provide heat. The precursor may be heated to at least 50° C. in the nozzle, dispensed onto the substrate in a pattern to form a precursor object, and the precursor object may be cured at a temperature of at least about 120° C. to harden the object. Alternately, the precursor may be heated to at least 120° C. in the nozzle, dispensed onto the substrate in a pattern to form a precursor object, and the precursor object may be cured at a temperature of about 200° C. to harden the object.

It should be noted that an object may include more than one type of PHA, more than one type of PHT, or more than one type of POTA by changing the monomers used to form the polymer during formation of the object. An object may also include PHA and PHT, PHA, and POTA, PHT and POTA, or PHA, PHT, and POTA in any desired mixture by changing the monomers used to form the polymer. Thus, an object may be form that is a mixture of PHA, PHT, and/or POTA to provide different parts of the object with different physical properties.

PHA, PHT, and POTA materials are depolymerizable. Depolymerization materials such as strong acids, hot solvents, and in some cases strong or weak bases, optionally photon-assisted with, for example, ultraviolet light, may dismantle such polymers into constituent monomers. Localized application of depolymerization materials may be used to modify surfaces of such materials, which can be useful in repairing or removing unwanted textures and shapes from the surface. In this way, PHA, PHT, and POTA materials may be described as "healable" materials. Such properties of PHA, PHT, and POTA materials may be equally useful in interpenetrated networks of PHA, PHT, and POTA materials with polymerizable monomer networks. The PHA, PHT, or POTA portion may be locally depolymerized by applying a solvent, such as acetone, along with a light source such as a UV lamp, to dismantle a local portion of the PHA, PHT, and/or POTA network to monomers. The monomers can be mixed with more gel, as described above, or the monomers can be removed and replaced with gel, and the gel can be hardened as described above to repair the article.

Example Formation of PHA Films:

4,4'-Oxydianiline (ODA, 0.400 g, 2.0 mmol) and paraformaldehyde (PF, 0.300 g, 10.0 mmol, 5 eq.) were weighed into a 2-Dram vial with equipped with a stirbar. NMP (6 mL, 0.33 M with respect to ODA) was added to the vial under nitrogen. The vial was capped but not sealed. The solution was stirred at 50° C. for 30 minutes (time sufficient to form soluble oligomers in NMP). The clear and colorless solution was then filtered through a nylon syringe filter (0.45 micrometers) onto a glass plate with aluminum tape (80 micrometers thickness) boundaries. The film was cured at 50° C. for 24 hours. The clear and colorless polyhemiaminal film was then carefully peeled from the glass plate using a razor blade. The process was repeated with an ODA:PF mole ratio of 1:6.7, and again with an ODA:PF mole ratio of 1:10. PHA films were also prepared according to the same process, but substituting 4,4'-methylenedianiline (MDA) for ODA at an MDA:PF mole ratio of 1:5, substituting 4,4'-fluorenylidenedianiline (FDA) for ODA at an FDA:PF mole ratio of 1:5, and substituting poly(ethylene glycol)diamine (PEG-DA) for ODA at a PEG-DA:PF mole ratio of 1:5.

Example Formation of PHT Films:

ODA (0.400 g, 2.0 mmol) and PF (0.150 g, 5.0 mmol, 2.5 equiv) were weighed into a 2-Dram vial equipped with a stirbar. NMP (6 mL, 0.33 M with respect to ODA) was added to the vial under nitrogen and the vial was capped. The vial was not sealed. The solution was allowed to stir at 50° C. for 30 minutes (time sufficient for solubility of reagents in NMP). The clear and colorless solution was then filtered through a nylon syringe filter (0.45 micrometer) onto a leveled glass plate with aluminum tape (80 micrometers thickness) boundaries and allowed to cure according to the following ramping procedure: 22° C. to 50° C. over 1 hour; then 50° C. to 200° C. over 1 hour, and hold at 200° C. for 1 hour. The yellow film was then carefully peeled from the glass plate using a razor blade. The process was repeated with an ODA:PF mole ratio of 1:5, and again with an ODA:PF mole ratio of 1:10. PHA films were also prepared according to the same process, but substituting 4,4'-methylenedianiline (MDA) for ODA at an MDA:PF mole ratio of 1:2.5, and substituting 4,4'-fluorenylidenedianiline (FDA) for ODA at an FDA:PF mole ratio of 1:2.5. Such films may be used in 3D printing processes to form an object by repeatedly depositing PHT films on a substrate.

Example Formation of POTA Material:

In one example, 0.050 g of p-phenylenedianiline (0.462 mmol, 1.0 equivalents, purchased from Sigma-Aldrich Co., LLC, of St. Louis, Mo. and stored under nitrogen) and 0.0277 g paraformaldehyde (0.924 mmol, 2.0 equivalents, washed with water, acetone, the diethyl ether, then dried over P2O5 prior to use) were combined in a dried vial with stirbar in a nitrogen-filled glovebox with 0.5 mL of dry DMSO (refluxed over CaH2 for 96 hours prior and then distilled prior to use). Formic acid, 0.004 g, was then added by syringe to the solution (0.231 mmol, 0.5 equivalents). The result was an orange solution of poly-N,N,N-(p-phenylenedianiline)-octatriazacane.

While the foregoing is directed to embodiments of the present invention, other and further embodiments of the invention may be devised without departing from the basic scope thereof, and the scope thereof is determined by the claims that follow.

We claim:

1. A method of forming an object, comprising:

flowing a polyhemiaminal (PHA), polyhexahydrotriazine (PHT), or polyoctatriazacane (POTA) precursor mixture to a nozzle of a 3D printer;

heating the PHA, PHT, or POTA precursor to a temperature of at least 50° C.;

dispensing the PHA, PHT, or POTA precursor in a pattern; and hardening the PHA, PHT, or POTA precursor into a polymer.

2. The method of claim 1, wherein dispensing the PHA, PHT, or POTA precursor in a pattern comprises forming a first film of the PHA, PHT, or POTA precursor on a substrate and forming a second film of the PHA, PHT, or POTA precursor on the first film.

3. The method of claim 2, wherein the precursor comprises a PHA, and the PHA is a crosslinked polymer comprising i) a plurality of trivalent hemiaminal groups of formula (1):

covalently linked to ii) a plurality of bridging groups of formula (2):

wherein y' is 2 or 3, and K' is a divalent or trivalent radical comprising at least one 6-carbon aromatic ring.

4. The method of claim 2, wherein the precursor comprises a PHT, and the PHT is a crosslinked polymer comprising i) a plurality of trivalent hexahydrotriazine groups of formula (8):

covalently linked to ii) a plurality of bridging groups of formula (2):

wherein y' is 2 or 3, and K' is a divalent or trivalent radical comprising at least one 6-carbon aromatic ring.

5. The method of claim 2, wherein the precursor comprises a POTA, and the POTA is a polymer having a plurality of octatriazacane groups of formula (10):

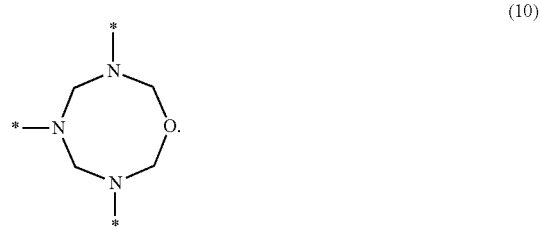 [SMILES: *N1COCN(*)CN(*)C1]

6. The method of claim 2, wherein the precursor comprises a primary diamine and a formaldehyde-type reagent.

7. The method of claim 6, wherein the precursor further comprises formic acid.

8. The method of claim 1, wherein flowing the PHA, PHT, or POTA precursor mixture to a nozzle of a 3D printer comprises flowing a first mixture comprising a formaldehyde-type reagent through a first pathway and flowing a second mixture comprising a primary diamine through a second pathway.

9. The method of claim 1, wherein heating the PHA, PHT, or POTA precursor to a temperature of at least 50° C. comprises supplying heat to the nozzle.

10. A method of forming an object, comprising:
flowing a first mixture comprising a formaldehyde-type reagent through a first pathway;
flowing a second mixture comprising a primary diamine through a second pathway;
mixing the first and second mixtures to form a PHA, PHT, or POTA precursor;
flowing the PHA, PHT, or POTA precursor to a nozzle of a 3D printer;
supplying heat to the nozzle of the 3D printer to heat the PHA, PHT, or POTA precursor to a temperature of at least 50° C.;
dispensing the PHA, PHT, or POTA precursor in a pattern onto a substrate to form a precursor object comprising a PHA, PHT, or POTA cross-linked polymer; and
hardening the PHA, PHT, or POTA precursor into a polymer by heating the precursor object to a temperature of at least 50° C.

11. The method of claim 10, wherein the precursor object comprises a PHA, and the PHA is a crosslinked polymer comprising i) a plurality of trivalent hemiaminal groups of formula (1):

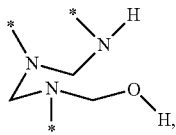
(1)

covalently linked to ii) a plurality of bridging groups of formula (2):

(2), wherein y' is 2 or 3, and K' is a divalent or trivalent radical comprising at least one 6-carbon aromatic ring.

12. The method of claim 10, wherein the precursor object comprises a PHT, and the PHT is a crosslinked polymer comprising i) a plurality of trivalent hexahydrotriazine groups of formula (8):

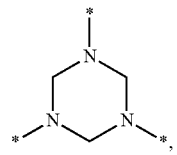
(8)

covalently linked to ii) a plurality of bridging groups of formula (2):

(2), wherein y' is 2 or 3, and K' is a divalent or trivalent radical comprising at least one 6-carbon aromatic ring.

13. The method of claim 10, wherein the precursor object comprises a POTA, and the POTA is a polymer having a plurality of octatriazacane groups with the structure of formula (10):

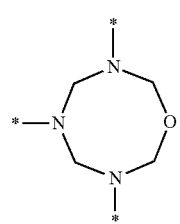
(10)

covalently bonded to divalent linking groups having the general structure *-K-*, where K' comprises an aromatic group.

14. The method of claim 10, wherein the precursor object comprises two or more of a PHA, a PHT, and a POTA.

15. The method of claim 10, wherein hardening the PHA, PHT, or POTA precursor into a polymer comprises heating the precursor object to a temperature of at least 120° C.

16. The method of claim 1, further comprising removing a PHT portion of the polymer by applying a solvent, a light source, or a combination thereof.

17. The method of claim 10, further comprising removing a PHT portion of the polymer by applying a solvent, a light source, or a combination thereof.

* * * * *